(12) United States Patent
Drodofsky et al.

(10) Patent No.: US 7,706,064 B2
(45) Date of Patent: Apr. 27, 2010

(54) DEVICES FOR THE MAGNIFIED VIEWING OF AN OBJECT

(75) Inventors: Ulrich Drodofsky, Berneck (CH); Gerd Gstoehl, Dornbirn (AT); Dusan Zadravec, Rebstein (CH)

(73) Assignee: Vectronix AG, Heerbrugg (CH)

( * ) Notice: Subject to any disclaimer, the term of this patent is extended or adjusted under 35 U.S.C. 154(b) by 89 days.

(21) Appl. No.: 11/660,390

(22) PCT Filed: Aug. 11, 2005

(86) PCT No.: PCT/EP2005/008708

§ 371 (c)(1),
(2), (4) Date: Jul. 18, 2007

(87) PCT Pub. No.: WO2006/018212

PCT Pub. Date: Feb. 23, 2006

(65) Prior Publication Data
US 2007/0273968 A1    Nov. 29, 2007

(30) Foreign Application Priority Data
Aug. 16, 2004   (CH) .................................... 1349/04

(51) Int. Cl.
G02B 23/04 (2006.01)
(52) U.S. Cl. .................... 359/431; 359/407; 359/419; 359/423
(58) Field of Classification Search ................ 359/431, 359/407, 419, 423
See application file for complete search history.

(56) References Cited

U.S. PATENT DOCUMENTS

| 5,579,165 | A | * | 11/1996 | Michel et al. | ................ 359/630 |
| 5,712,726 | A | * | 1/1998 | Espie et al. | ................ 359/419 |
| 6,204,961 | B1 | | 3/2001 | Anderson et al. | |
| 6,470,264 | B2 | * | 10/2002 | Bide | ........................... 701/207 |
| 2002/0034004 | A1 | * | 3/2002 | Khoshnevis et al. | ........ 359/407 |
| 2003/0002149 | A1 | * | 1/2003 | Watanabe | ................... 359/407 |

FOREIGN PATENT DOCUMENTS

DE    3704848 A1    3/1988

* cited by examiner

Primary Examiner—Joshua L Pritchett
(74) Attorney, Agent, or Firm—Rothwell, Figg, Ernst & Manbeck, P.C.

(57) ABSTRACT

A device for the magnified viewing of an object, from which object rays originate, includes a lens system (1) for collecting object rays. In one embodiment of the invention, the device includes: a display (2) from which display rays (14) originate, and; a left eyepiece (3) and a right eyepiece (3), via which a left-eye and right-eye beam (5 and 6) of visual field rays are projected into the left and right eye of a user of the device. According to this inventive embodiment, an optical component (7, 8, 9, 10, 11) is provided with a physical ray distributing surface (12) on which a beam of collected object rays (13) and a beam of display rays (14) can be superimposed and can be divided up into the left-eye beam and right-eye beam (5, 6) of the visual field rays. This enables a reduction in losses of display rays and object rays.

21 Claims, 3 Drawing Sheets

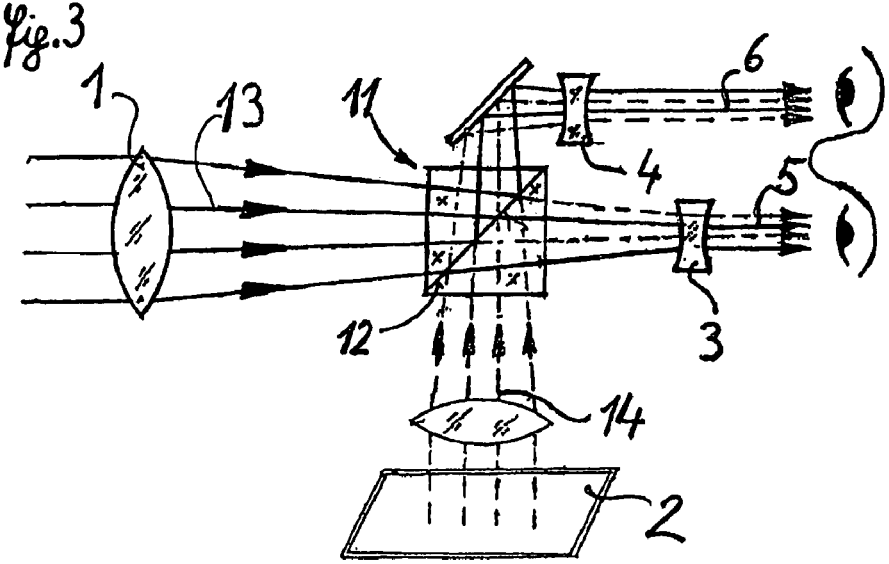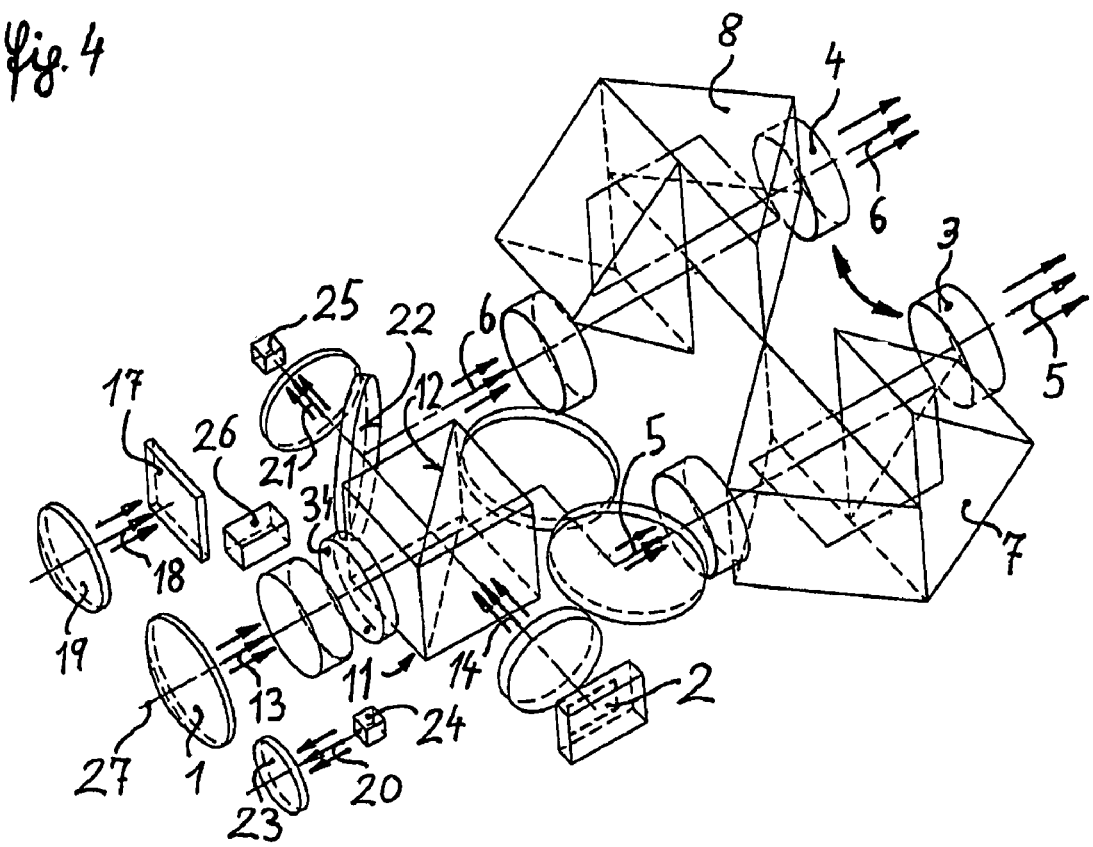

DEVICES FOR THE MAGNIFIED VIEWING OF AN OBJECT

CROSS-REFERENCE TO RELATED APPLICATIONS

This application is a National Phase of International Application Serial No. PCT/EP2005/008708, filed 11 Aug. 2005.

BACKGROUND OF THE INVENTION

1. Field of the Invention

The invention relates to devices for the magnified viewing of an object, comprising an objective, a left eyepiece and a right eyepiece.

2. Description of the Background Art

Such optically magnifying devices, for example conventional binoculars or professional microscopes, have one eyepiece each for each eye of a user in order to permit viewing of an object over a prolonged period without premature fatigue. In contrast to a monocular telescopic sight, for example, a target object a long distance away can, if required, also be viewed for hours in an ergonomic manner. Such an optically magnifying device can also be provided with a display by means of which an image can be made available to the user, optionally also during the magnified viewing of the object. This image may be, for example, a thermal image of the object, a night vision image or an image having a represented measured value. Accordingly, prolonged viewing of the display without premature fatigue is also possible only via two eyepieces.

The two eyepieces of such devices must be formed in a manner known per se so as to be movable relative to one another in order to be able to adapt the spacing of the eyepieces to the individual eye spacing of the viewer. A left-eye and right-eye beam of optical rays can be projected into the left and right eye of the user via the left eyepiece and right eyepiece, respectively. These beams must correspond to one another in a manner known per se within narrow optical tolerances in order to avoid causing the user a headache on prolonged viewing. If the entry area for object rays emanating from the object is dimensioned to be appropriately large and transmission losses caused by the device are kept small, the projected visual field rays have an intensity which permits prolonged viewing of a distant object even under less optimal light conditions.

Hand-held devices in the form of conventional binoculars which are intended for viewing a distant object have a left-eye and a right-eye direct vision system having in each case an objective, an image inversion system and an eyepiece. As a rule, both direct vision systems are designed to be optically identical and are connected to one another via a folding mechanism. This permits in a simple manner the required mobility of the eyepieces with simultaneous compliance with the narrow tolerances with respect to the parallelism of the optical axes of the two direct vision systems and the optical imaging of the two separate beams. In this way, it is possible to realise light and robust devices for convenient viewing of distant objects, which devices can be held by the user himself in his hand and can be carried to the place of use. When provided with high-quality direct vision optical systems, they can also be used under less optimal light conditions, for example in twilight.

Since, when viewing a distant object using binoculars, information about the distance thereof relative to the user is often also of interest different measuring sensors, for example distance meters and/or magnetic compasses are integrated in so-called measuring binoculars. DE 37 04 848 A1 discloses such measuring binoculars in which measured values shown on a display are input via a physical beam splitter surface into the left-eye direct vision system and made available to the user during viewing of the distant object. At the physical beam splitter surface, rays collected by the objective are inevitably lost during such input, at least from the wavelength range of the input rays. This is disadvantageous particularly in the case of polychromatic displays. In addition, a part of the rays emanating from the display is also inevitably lost at the same physical beam splitter surface. Since the major part of the energy demand of such measuring binoculars is now due to the display, input losses of display rays additionally aggravate the energy supply problem present as a rule in the case of such portable devices.

U.S. Pat. No. 5,579,165 discloses computerised binoculars having two separate direct vision systems which have a digitally actuatable screen display with a multiplicity of pixels. By means of these, not only measured values but also recorded or computer-generated images can be projected into one of the two beam paths of the binoculars and optionally superimposed on a direct vision image. If a recorded and displayed image of the same object is to be superimposed on a direct vision image of an object, the precision of such a superimposition must meet high requirements so that the user does not see troublesome multiple images. For prolonged viewing, it would be possible in principle to provide two screen displays. However, this would have adverse effects on the energy consumption and the production costs of the device.

US 2002/0034004 A1 discloses binoculars having two separate direct vision systems which have a common display for the two separate direct vision systems. Via optical switches and partly transparent mirrors, it should be possible in this way to superimpose a digital image of the display alternately on the two direct vision images. Significant parts of the rays emanating from an object and from the common display would be lost thereby at the two disclosed physical beam splitter surfaces which are provided in the two separate beam paths of the direct vision systems, in particular in the case of a polychromatic display.

U.S. Pat. No. 6,204,961 discloses a day/night vision sighting system which has a direct vision system, a distance metre and an indirect vision system with an infrared image sensor and a display also for reproducing images recorded by the infrared image sensor. During use at night, images recorded by the infrared image sensor are made available to the user via the display, a partly transparent mirror and a single eyepiece. Such day/night vision sighting systems are now in the form of monocular laser distance metres or monocular telescopic sights which are not very suitable for prolonged observation.

SUMMARY OF THE INVENTION

It is an object of the invention to remedy deficiencies of the prior art. It is an object of the invention to provide a magnifying device having a display, by means of which device the display and an object can be viewed for a long time with magnification, optionally simultaneously.

It is a further object to provide a hand-held device for prolonged, magnified viewing of an object, which device is suitable as a device base for at least one, optionally image-generating, sensor.

These objects are achieved by a device for the magnified viewing of an object, which device has a display, and via a hand-held device for the magnified viewing of a distant object, having the features disclosed herein.

One development of the invention comprises a hand-held device for the magnified viewing of a distant object from which object rays emanate. It has an objective for collecting object rays, an image inversion system having reflective surfaces for collected object rays, a left eyepiece and a right eyepiece. A left-eye beam and a right-eye beam are projected into the two eyes of the user of the hand-held device via the respective eyepiece. According to this development of the invention, an optical component having a physical beam splitter surface is provided, at which surface a beam of collected object rays can be split into the left-eye and the right-eye beam of visual field rays. According to a further development, the optical component can be integrated in the image inversion system by providing a reflective surface of the image inversion system as a physical beam splitter surface, which permits a more compact, more stable and/or more economical construction.

In those solutions for hand-held devices for the magnified viewing of a distant object which are known from the prior art, comprising a single objective and a left eyepiece and a right eyepiece, the necessary splitting of the rays collected by the objective is effected by geometric beam splitting. This often limits possible uses of such devices, for example as a device base for a multifunctional observation apparatus.

A device according to this development is suitable in particular as a device base for a hand-held multifunctional observation apparatus. In addition to distance- and direction-measuring sensors, optionally a plurality of image-generating sensors having in each case a different sensitivity in different wavelength ranges can also be mounted on such a base and the one or other optical component of the device can be concomitantly used in combination with one of the sensors. Not least, this device base is also suitable for integration of a display. Via the display, it is possible, for example, to reproduce values measured by the sensors and/or images which have been recorded by the image-generating sensors or generated virtually.

Another development of the invention comprises a device for the magnified viewing of an object from which object rays emanate. It has an objective for collecting object rays, a display from which display rays emanate, a left eyepiece and a right eyepiece. Via the eyepieces, a left-eye and right-eye beam of visual field rays is projected into the two eyes of a user of the device. According to this development of the invention, an optical component having a physical beam splitter surface is provided, at which surface firstly a beam of collected object rays and a beam of display rays can be superimposed one on the other and secondly can be split into the left-eye and the right-eye beam of visual field rays.

According to the other development of the invention, the following four operations, tailored to one another, are thus carried out at one and the same beam splitter surface. Firstly a beam of object rays directed towards one side of the beam splitter surface is split into a left-eye and a right-eye part-beam. Secondly, a beam of display rays directed towards the other side of the same beam splitter surface is split into a left-eye and right-eye part-beam. Thirdly, the two left-eye part-beams are superimposed to give a left-eye beam of visual field rays. Fourthly, the two right-eye part-beams are superimposed to give a right-eye beam of visual field rays.

Although multiple use of a single beam splitter surface is already known from the Michelson interferometer, the combination of double, two-eye splitting and double superimposition in one device for the magnified viewing of an object simultaneously has a plurality of decisive advantages. Firstly, the transmittance of the direct vision optical system can be improved and secondly advantages can be achieved with regard to the energy efficiency and simplicity of provision of a two-eye display optical system. Furthermore, a compact design, high stability of the device and not least convenient, two-eye viewing of the display of the device are permitted. This is of decisive importance in particular in the case of hand-held multi-functional observation devices for day and night use.

Further alternatives or advantageous developments or further developments of the invention are described herein.

BRIEF DESCRIPTION OF THE DRAWINGS

Below, embodiments of devices according to the invention for the magnified viewing of objects are explained in more detail purely by way of example with reference to drawings.

FIG. 4 shows components of a working example of a device according to the invention for viewing a distant object and a display, in an oblique view, and FIGS. 5a and 5b schematically show components of an alternative working example of the device from FIG. 4, in side view and plan view, respectively.

DETAILED DESCRIPTION OF THE INVENTION

Figure 1:
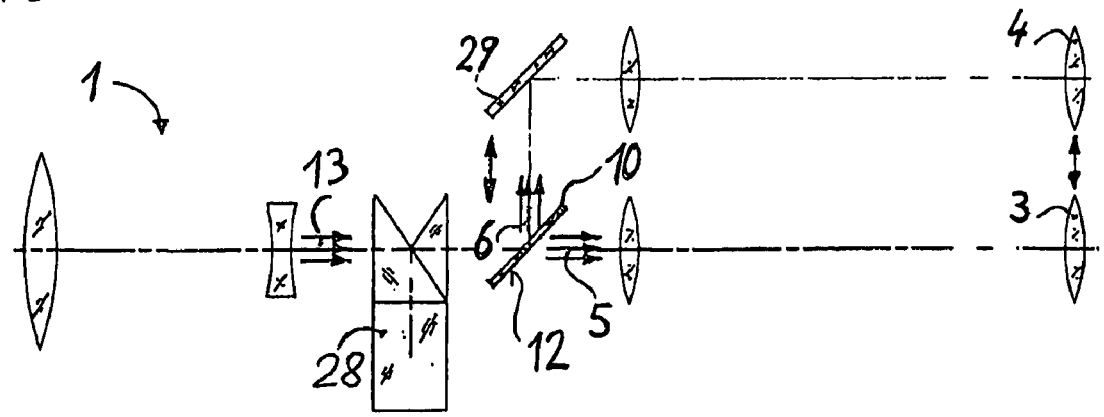
FIG. 1 schematically shows optical components of a working example of a device according to the invention for viewing a distant object, in plan view, FIG. 2 schematically shows optical components of an alternative working example of a device from FIG. 1, in an oblique view, FIG. 3 schematically shows optical components and a display of a device according to the invention for viewing an object and the display, in plan view.

FIG. 1 shows, in plan view, optical components of a working example of a device for the magnified viewing of a distant object according to a first development of the invention. Object rays emanate from the distant object not shown in FIG. 1.

This working example has a single objective 1, a central image inversion system 28 coordinated with the objective 1, a beam splitter plate 10, a reflective plate 29, further lenses, a left-eyepiece 3 and a right eyepiece 4.

Object rays are collected via the objective 1, which is afocal here, and guided as a collimated beam of collected object rays 13 via the central image inversion system 28 in the direction of the beam splitter plate 10. Here, the image inversion system 28 is, purely by way of example, in the form of a Porro prism of the second type. In principle, however, it could equally well be a Porro prism of the first type, a Schmid-Pechan, a Köinig-Abbe, an Uppendahl or another optical system having reflective surfaces for complete image inversion. The beam splitter plate 10 has a physical beam splitter surface 12 on which a dielectric layer is applied here. The beam of collected object rays 13 is split at the beam splitter surface 12 into a left-eye beam 5 and into a right-eye beam 6 of visual field rays. Via the dielectric layer, the beam of collected object rays 13 is split here, symmetrically, without significant losses of rays, into the left-eye and the right-eye beams 5 and 6. The collimated, right-eye beam 6 is guided towards the reflective plate 29 and from this via one of the further lenses in the direction of the right eyepiece 4. The right-eye beam 6 of visual field rays is reflected here—in contrast to the left-eye beam 5—by two further reflective surfaces. The left-eye and right-eye beams 5 and 6 of visual field rays are then projected into the left and the right eye, respectively, of a device user not shown in FIG. 1, via the left and the right eyepieces 3 and 4.

In this working example, the reflective plate 29, the right eyepiece 4 and one of the further lenses are connected firmly to one another and are connected via a linear guide which is not shown so as to be displaceable perpendicular to the optical axes of the eyepieces 3 and 4. Consequently, spacing of the eyepieces 3 and 4 can be adapted to the eye spacing of the respective user.

Here, the entry aperture of the objective 1 has, for example, a diameter of sixty millimetres. Substantially because of appropriate coatings of the optical components—in particular of the beam splitter—the device is distinguished by small transmission losses of visible rays. Consequently, even distant objects can be viewed for a long time and conveniently in a purely optical manner—in so-called direct vision—with both eyes during the day as well as in twilight, for example with ten times magnification.

As part of a multifunctional observation apparatus, a device according to this working example can be used during the day and in twilight, firstly as an observation means and secondly as a sighting means, for example for the distance sensor or a laser-based target illumination. In the working example from FIG. 1, the left-eye beam path is particularly suitable as a sighting means since the objective 1, the central image inversion system 28 and a target plate not shown in FIG. 1 can be connected firmly to one another in principle via a single housing part. As a result high directional stability and robustness of the sighting means can be ensured.

Figure 2:
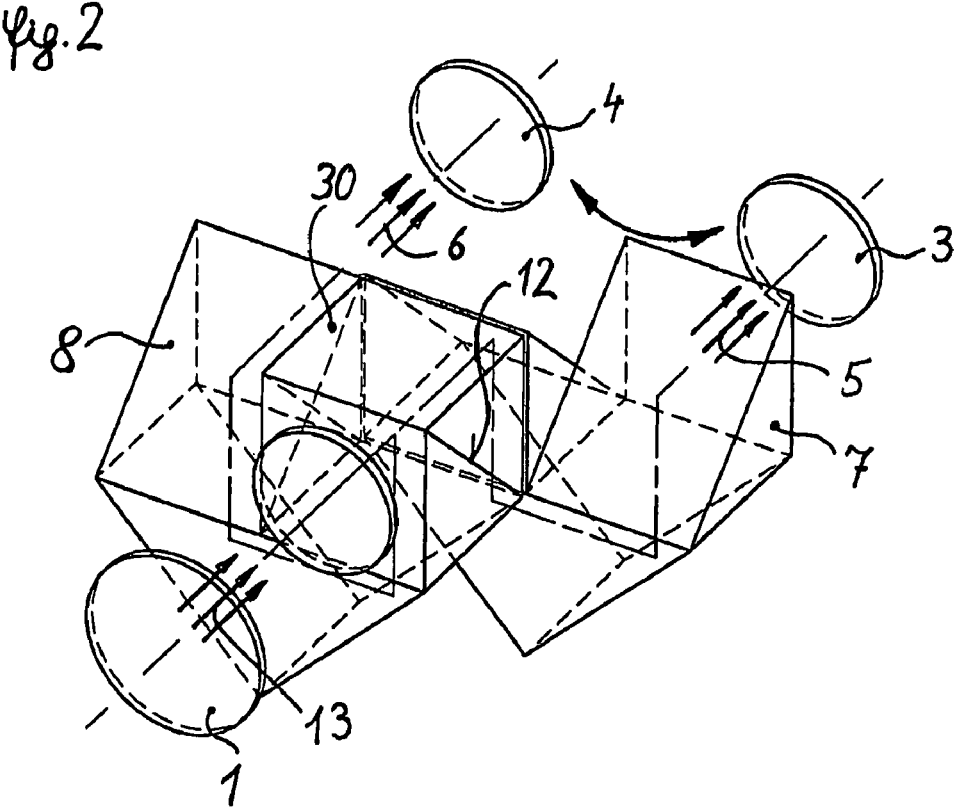

FIG. 2 shows optical components of an alternative working example of the device according to the invention for the magnified viewing of a distant object from FIG. 1 in an oblique view.

This working example likewise has a single objective 1, which in this case is not afocal, a left eyepiece 3 and a right eyepiece 4, which, in contrast to FIG. 1, are connected so as to be pivotable relative to one another. Instead of the central image inversion system 28, the beam splitter plate 10 and the reflective plate 29 of the device from FIG. 1, a left-eye image inversion system 7 and a right-eye image inversion system 8 with an attached auxiliary prism 30 are provided here.

The two image inversion systems 7 and 8 are likewise in the form of Porro prisms of the second type and in each case are coordinated with one of the two eyepieces 3 and 4. The right-eye image inversion system 8 is arranged here between the objective 1 and the left-eye image inversion system 7. The first of four reflective surfaces of the right-eye image inversion system 8 in the direction of propagation of the beam of collected object rays 13 is in the form of physical beam splitter surface 12 here. The beam of collected object rays 13 is split at the first reflective surface into a left-eye beam 5 and right-eye beam 6 of visual field rays—here likewise symmetrically. Here, in addition to complete image inversion the function of an optical component according to the invention—the splitting into the left-eye and right-eye beams 5 and 6 of visual field rays—is simultaneously performed here by the right-eye image inversion system 8. The auxiliary prism 30 is arranged on the physical beam splitter surface 12. The left-eye beam 5 propagates about the auxiliary prism 30 in the direction of the left-eye image inversion system 7. Here, the left-eye and right-eye beams 5 and 6 of visual field rays are reflected at the four reflective surfaces of the respective coordinated image inversion systems 7 and 8.

Here, the left-eye image inversion system 7 and the left eyepiece 3 are connected firmly to one another and are connected via a journal bearing not shown in FIG. 2 to the right-eye inversion system 8 and the objective 1 so as to be pivotable about the optical axis thereof. Consequently, the spacing of the eyepieces 3 and 4 can be appropriately adapted to the eye spacing.

This alternative working example, too, can advantageously be used as a device base for a hand-held, multifunctional observation apparatus, for example for military target acquisition and determination of coordinates during the day and during the night. A display to be integrated for this purpose into this working example would advantageously be arranged here above the auxiliary prism 30. Thus, an image provided, for example, by an image-generating sensor could be viewed for hours with both eyes.

In this working example, in particular the right-eye beam path would be suitable for a sighting means. In this, the objective 1, the right-eye inversion system 8 and a target plate not shown in FIG. 2 could be connected firmly to one another, optionally via a single housing part, and could be aligned with one another in a positionally stable manner.

FIG. 3 shows, purely schematically, components of a device for the magnified viewing of an object and of a display 2 of the device according to a second development of the invention.

This device has, as optical components, an objective 1, a splitter cube 11, a left eyepiece 3, a right eyepiece 4 and, as an electrooptical component, a display 2. The display 2 may be in the form of, for example, a polychromatic organic light emitting display having a multiplicity of pixels. The splitter cube 11 contains a physical beam splitter surface 12 which is provided with a dielectric layer.

Rays emanating from an object not shown here are collected by the objective 1 and directed as a beam of collected object rays 13 in the direction of the splitter cube 11 towards one side of the physical beam splitter surface 12. One half of the beam of collected object rays 13 can pass through the beam splitter surface 12 as part of the left-eye beam 5 of visual field rays in the direction of the left eyepiece 3, while the other half is reflected as part of the right-eye beam 6 at the beam splitter surface 12 in the direction of the right eyepiece 4. This part of the left-eye or right-eye beam 5 or 6 of visual field rays is projected into the left or the right eye, respectively, of a device user indicated in FIG. 3, via the left eyepiece and the right eyepiece 3 and 4. As a result, the user can view the object over a long time.

In this device, however, an image which is produced here with mirror inversion is also indicated on the display 2. A beam of display rays 14 transmitted from the display 2 is collected via a collecting lens and, according to this development of the invention, directed towards the other side of the beam splitter surface 12. One half of the beam of display rays 14 can pass through the beam splitter surface 12 in the direction of the right eyepiece 4 as a further part of the right-eye beam 6 while the other half is reflected at the beam splitter surface 12 in the direction of the left eyepiece 3 as a further part of the left-eye beam 5. The user of this device can thus view, in magnified form, the object and the device display 2 superimposed on the object, in each case with both eyes. Prolonged viewing of the object and/or of the display is thus permitted in an ergonomic manner.

Through a combination, according to the invention, of splitting of the beam of object rays 13 and of the beam of display rays 14 in each case into a left-eye and right-eye part and the superimposition of the left-eye or the right-eye parts to give the left-eye and right-eye beams 5 and 6 of visual field rays, it becomes possible to input a beam of display rays 14 into the left-eye and into the right-eye visual channel of a direct vision system without losing significant parts of the beam of object rays 13 and/or of the beam of display rays 14.

At an ideal beam splitter, there would be no losses at all in the case of the splitting and superimposition according to the invention.

By means of a mechanical or electrooptical closure not provided in this device and present in the direct vision beam path up to the physical beam splitter surface or simply an objective cap, it would be possible to view only the image reproduced on the display 2 without light collected by the objective.

If, on the other hand, graphical or alphanumeric information—for example a target plate, a symbol or a measured value which can be coordinated with the object—is to be made available to the user as an image during viewing of the object, the image of this information can be superimposed on the direct vision image for the user via the display 2. If the background brightness of the direct vision image is too high, an optionally variable attenuation element can be provided in the case of a device according to the invention—as shown in FIGS. 4 and 5*b*. This attenuation element may be, for example, in the form of an LCD, iris or attenuation filter. When positioned in the beam path between the objective and the physical beam splitter surface, the beam of collected object rays 13 can be completely or partly attenuated via such an attenuation element.

With the aid of this device, it is also possible to reproduce a recorded image of the object via the display 2 and to superimpose it on a direct vision image of the same object. Here—in contrast to some projection solutions known from the prior art—the beams to be mutually superimposed need not necessarily be collimated. It is obvious that such superimposition of a purely optically generated direct vision image and of an electrooptically generated indirect vision image in addition to a recording corresponding to the direct vision image and reproduction of the object also requires a precise and positionally stable arrangement and alignment of those components of the device which determine the splitting and superimposition. If this precision and stability are not present, troublesome double images occur. The local combination, according to the invention, of the splitting of the beam of object rays 13 on the one hand and of the beam of display rays 14 on the other hand, in each case into a left-eye and right-eye part, and on the other hand, the superimposition of the left-eye and right-eye parts at one and the same beam splitter surface 12 very substantially facilitate precise and positionally stable arrangement and alignment of the components determining the splitting and superimposition.

FIG. 4 shows, in an oblique view, the optical and electrooptical components of a working example of a device for the viewing of a distant object and of a display 2 of the device. Here, the device is in the form of a hand-held, multifunctional observation apparatus and comprises both the first and the second development of the invention. The distant object to be viewed is typically present at a distance of a few hundred to several thousand metres.

The multifunctional observation apparatus serves, during the day and during the night, firstly for prolonged viewing of a distant object and secondly for determining the position thereof relative to the observation apparatus. The determination of the distance to the object or of the azimuthal and zenithal orientation of a line of sight 27 of the observation apparatus is effected via a distance sensor and via a direction sensor 26, which are integrated in the observation apparatus. Here, the direction sensor 26 is in the form of a digital magnetic compass. Via the digital magnetic compass, which here has three magnetic field sensors fixed on the apparatus and intended for three-dimensional measurement of the Earth's magnetic field and two tilt sensors for measuring the direction of the gravitational field of the Earth, the azimuthal and zenithal orientation of the line of sight 27 and the tilt of the observation apparatus about the line of sight 27 can be measured relative to the horizontal plane. In this working example, the line of sight 27 is fixed via a target plate indicated on the display 2 and substantially corresponds to the optical axis of the objective 1. The azimuthal orientation could also be determined by means of a rotation rate sensor.

In addition to the objective 1, the splitter cube 11 and the two eyepieces 3 and 4 from the preceding working examples, this working example of a multifunctional observation apparatus has, as optical components, two image inversion systems 8 and 9 in the form of Porro prisms of the first type and coordinated in each case with one of the eyepieces 3 and 4, a wavelength-selective mirror 22, a further pair of mirrors, various lenses, an image sensor objective 19, a transmitter objective 23 and an attenuation element 34 in the form of an iris. In addition to the display 2 in the form of a coloured organic light emitting display, it has, as electrooptical components, an image sensor 17, a transmitter 24 and a receiver 25. Here, both image inversion systems 7 and 8 are pivotable relative to the objective 1 and the display 2.

Under good visual conditions, the distant object can be observed in a purely optical manner comparable with the working examples from FIGS. 1 and 2. Here, in a manner comparable with FIG. 3, firstly the beam of object rays 13 which is collected by the objective 1 and secondly the beam of display rays 14 which is collected via a lens and emanates from the display 2 are split at the physical beam splitter surface 12 of the splitter cube 11 and the parts thereof are superimposed accordingly to give left-eye and right-eye beams 5 and 6 of visual field rays. In contrast to the device from FIG. 3, here beams of collimated rays are split and superimposed.

In contrast to the first two working examples, here the left-eye image inversion system 7 is used only by left-eye beam 5 and the right-eye inversion system 8 only by right-eye beam 6. Both the left-eye and the right-eye beams 5 and 5 of visual field rays are reflected here at 6 reflective surfaces in each case. The requirement with respect to left-eye and right-eye beams 5 and 6 of visual field rays which are as identical as possible optically can be more easily met by the same optical distance of the left-eye and of the right-eye beams 5 and 6. After image inversion is complete, the left eyepiece and the right eyepiece 3 and 4 project the left-eye beam 5 and right-eye beam 6 of visual field rays, both of which comprise object and/or display rays, into the left and the right eye, respectively, of a user of the multifunctional observation apparatus, via the left and the right eyepieces 3 and 4.

For determining the distance between the distant object and the observation apparatus, here a beam of transmitted rays 20 is projected onto the object from the transmitter 24 via a separate transmitting objective 23. The transmitter 24 has, for example, a laser diode with a wavelength of one and a half microns. Transmitted rays reflected by the object are collected here again via the objective 1 and directed via the splitter cube 11 towards the receiver 25 having, for example, an avalanche diode. Depending on the wavelength of the beam of transmitted rays 20, it might also be advantageous to coordinate the image sensor objective 19 alternatively with the transmitter 24 and/or the receiver 25.

Here, the wavelength-selective mirror 22 arranged between the receiver 25 and the splitter cube 11 has a dichroic coating. The transmitted rays 20 reflected by the object and collected by the objective 1 are not reflected by the wavelength-selective mirror 22 and can thus reach the receiver 25, in contrast to the visible rays of the right-eye beam 6. The distance and, via the direction sensor 26, the azimuthal and zenithal orientation of the line of sight 27 can then be determined in a manner known per se.

If, during the viewing of the distant object, the relative position determined by the observation apparatus is to be made available to the user, the values can be shown on the display 2. In this way, it would also be possible to make available to the user, for measurement purposes, graphic patterns, for example a reticular image, during the viewing. It would also be conceivable to make such a reticular image available to the user via an additional display, optionally specifically produced for this purpose.

With this working example in the form of a multifunctional observation apparatus, it is also possible—in contrast to the working examples from FIGS. 1 and 2—to view a distant object during the night. For this purpose, a beam of further object rays 18 is collected via the image sensor objective 19 and focused on the image sensor 17. The image sensor objective 19 is formed in such a way that rays from near infrared wavelength ranges can also be collected.

The image sensor 17 is in the form of a focal plane array and is based, for example, on low-noise CMOS technology, electron bombardment CMOS technology, infrared photoelectronic technology or bolometric technology. The choice of the respective technology is determined inter alia by the wavelength range required during use. In applications in the night and under poor visual conditions, it would be possible to use image sensors for rays from near infrared wavelength ranges, in particular between three and five or between eight and twelve microns. Depending on the intended use, a device according to the invention having a display may also serve as a device base for a plurality of different image sensors simultaneously for different wavelength ranges in each case.

Here, the image converted into an electrical signal is transmitted to the display 2 after mirror-symmetrical transformation. Rays coordinated with the transformed image and emanating from the display 2 are collected via a lens. The beam of display rays 14 thus contains an indirect vision image of the distant object generated in an electrooptical manner. This indirect vision image is likewise projected into both eyes of the user via the splitter cube 11, the wavelength-selective mirror 22, the pair of mirrors and the eyepieces 3 and 4. If the direct vision image still has acceptable light intensity, it is reproduced with superimposition thereon. If, on the other hand, the direct vision image has a substantially greater light intensity than the indirect vision image of the display 2, the light intensity of the direct vision image can be correspondingly reduced via the variable attenuation element 34 which is in the form of an iris here.

In the same way, a virtual image, for example a map and/or certain symbols, can be superimposed on the direct vision image. In addition to the orientation of the line of sight 27, the tilt of the multifunctional observation apparatus about the line of sight 27 relative to the horizontal plane must also be measured via the direction sensor 26 and the virtual image shown with appropriate orientation on the display 2.

A GPS receiver could also be integrated into the multifunctional observation apparatus. Via a tripod connection not shown in FIG. 4, the multifunction observation apparatus could be mounted on a tripod, here preferably made of non-magnetic material, for prolonged deployments or observations.

Figure 5A:
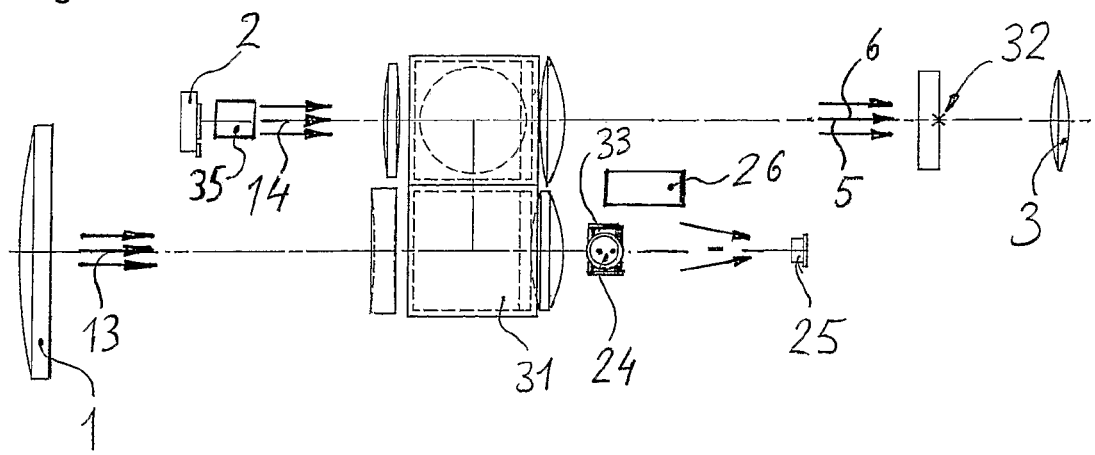
Figure 5B:
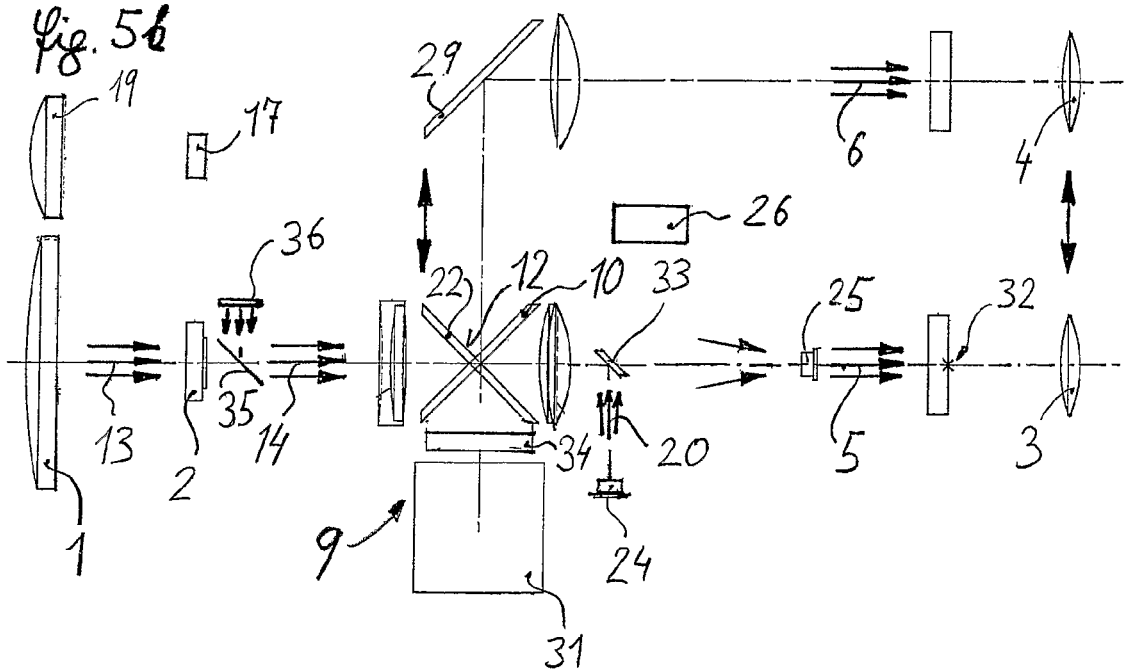

FIGS. 5a and 5b show, in side view and in plan view, respectively, the optical and electrooptical components of an alternative working example of the device from FIG. 4, which device, here too, is in the form of a hand-held, multifunctional observation apparatus having a distance sensor and direction sensor 26 and comprises both developments of the invention.

The indirect vision optical system comprises the image sensor objective 19, the image sensor 17 and the display 2 of the working example from FIG. 4. In contrast, however, the image on the display 2 is not shown here with mirror inversion since the beam of display rays 14 is focussed upright via the eyepieces 3 and 4.

The direct vision optical system of this working example is based on the optical system of the working example from FIG. 1. In contrast to the central image inversion system 28 from FIG. 1, here, however, a common image inversion system 9 which, in addition to the wavelength-selective mirror 22 from FIG. 4, the beam splitter plate 10 and reflective plate 29 from FIG. 1, has a corner prism 31 is provided. In addition, two glass plates arranged in the image plane of the objective 1 are provided here. Here, a reticular pattern 32 is applied to the glass plate coordinated with the left eyepiece 3. In addition to the applied reticular pattern 32, a display figure in the form of a reticule is provided here. The substantially monochromatically luminous display figure is reflected here on a display 36 specifically produced for this purpose, via a narrow-band, wavelength-selective filter 35 of the physical beam splitter surface 12, into the beam path of the display 2. However, it would also be conceivable here to input the display figure via a reflective surface of the corner prism 31.

The beam of collected object rays 13 is reflected by the wavelength-selective mirror 22 in the direction of the corner prism 31. By means of two further total reflections by the two reflective surfaces of the corner prism 31, the beam of collected object rays 13 is directed towards the beam splitter plate 10 having the physical beam splitter surface 12. There, the beam of collected object rays 13 is split into a left-eye beam 5 and into a right-eye beam 6 of visual field rays. Here, the common image inversion system comprises 3 common reflective surfaces and in each case a separate reflective surface for the left-eye and the right-eye beams 5 and 6 of visual field rays. The separate reflective surface for the left-eye beam 5 is also in the form of an optical component having the physical beam splitter surface 12 according to the invention. The right-eye beam 6 can propagate towards the reflective plate 29 through the physical beam splitter surface 12 and is guided by said reflective plate in the direction of the right eyepiece 4.

In comparison with the working example from FIG. 4, here the distance sensor has a higher degree of integration in the direct vision optical system. Here, the beam of transmitted rays 20 is projected from the transmitter 24 via a small input mirror 33 through the wavelength-selective mirror 22 and the objective 1 on to the distant object. Transmitted rays 21 reflected by the object are collected again via the same objective 1 and focussed through the same wavelength-selective mirror 22 past the small input mirror 33 onto the receiver 25. A small central part of the transmitted rays 21 reflected by the object cannot pass through the small input mirror 33, which acts here as a geometric beam splitter in the beam path of the distance sensor.

In a device according to the invention, variable magnification of the direct vision optical system can of course be provided via an additional group of lenses, preferably in the objective system. However, it would also be conceivable—as is known from the prior art—in each case to provide an additional group of lenses in the two eyepieces, with the result that the display 2 could also be viewed with variable magnification.

The invention claimed is:

1. A hand-held device for the magnified viewing of a distant object from which object rays emanate, comprising
   a single objective for collecting object rays;
   at least one image inversion system which has a plurality of reflective surfaces for collected object rays;
   a left eyepiece and a right eyepiece for projecting a left-eye beam of visual field rays and a right-eye beam of visual field rays, respectively; and
   a display from which display rays emanate; and
   an optical component having a single physical beam splitter surface disposed at an intersection of the collected object rays and the display rays and configured to superimpose a beam of collected object rays and a beam of display rays on one another and to split the superimposed collected object rays and display rays into the left-eye and the right-eye beam of visual field rays.

2. The hand-held device as claimed in claim 1, in which a left-eye image inversion system and a right-eye image inversion system are provided.

3. The hand-held device as claimed in claim 2, in which the left-eye and the right-eye image inversion system are pivotable about a common axis relative to the objective.

4. The hand-held device as claimed in claim 1, in which the optical component is in the form of the at least one image inversion system and one of the plurality of reflective surfaces is in a form of physical beam splitter surface.

5. The hand-held device as claimed in claim 1, in which the optical component is in a form of a parallel plate or splitter cube.

6. The hand-held device as claimed in claim 1, in which the two eyepieces are linearly displaceable or pivotable relative to one another.

7. The hand-held device as claimed in claim 6, in which only one of the two eyepieces is movable relative to the objective.

8. The hand-held device as claimed in claim 1, in which an attenuation element, is provided between the objective and the physical beam splitter surface.

9. The hand-held device of claim 8 wherein said attenuation element is a variable attenuation element.

10. The hand-held device as claimed in claim 1, in which at least one image sensor for converting a beam of further collected object rays into a signal is provided, it being possible to coordinate the beam of display rays with the signal for the electrooptical observation of the distant object.

11. The hand-held device as claimed in claim 10, in which a further objective coordinated with the image sensor and intended for collecting the beam of further collected object rays is provided.

12. The hand-held device of claim 11 wherein the beam of further collected object rays comprise infrared wavelength ranges.

13. The hand-held device of claim 12 wherein said ranges comprise at least one of 2-5 microns or 8-12 microns.

14. The hand-held device as claimed in claim 1, in which a distance sensor having a line of sight is provided, which distance sensor sends transmitted rays towards the distant object, transmitted rays collected by the objective and reflected by the distant object being capable of being output to the distance sensor via a wavelength-selective reflective surface.

15. The hand-held device as claimed in claim 14, in which the transmitted rays can be projected onto the distant object via the objective, optionally input coaxially via an input mirror.

16. The hand-held device of claim 15 wherein the transmitted rays are input coaxially via an input mirror.

17. The hand-held device as claimed in claim 14, in which a data interface is provided, via which at least one of the distance sensor, the direction sensors or the at least one image sensor can be at least one of actuated or information provided by them can be read out.

18. The hand-held device as claimed in claim 1, in which direction sensors for determining azimuthal orientation of the line of sight are provided.

19. The hand-held device as claimed in claim 18, in which the direction sensors comprise a magnetic field sensor or a rotation rate sensor in addition to a tilt sensor.

20. The hand-held device as claimed in claim 18, in which further direction sensors for determining a tilt of the eyepieces about the line of sight are provided.

21. The hand-held device of claim 18 wherein the direction sensors further determine zenithal orientation of the line of sight.

* * * * *